United States Patent Office 3,832,325
Patented Aug. 27, 1974

3,832,325
WEAR RESISTANT COMPOSITION BRAKE BLOCK
Franklin W. Eschen, Evergreen, Colo., assignor to Johns-Manville Corporation, Greenwood Village, Colo.
No Drawing. Filed Apr. 23, 1973, Ser. No. 353,830
Int. Cl. C08g 51/04
U.S. Cl. 260—38                                14 Claims

ABSTRACT OF THE DISCLOSURE

Compositions useful as railroad brake blocks are composed of SBR or nitrile rubber in combination with low (0.1–2%) zinc oxide, asbestos fiber, cast iron chips, a lead component, thermosetting resin, sulfur, and minor components. Such compositions show unexpectedly low and constant wear rates when compared to composition railroad brake blocks of the prior art.

BACKGROUND OF THE INVENTION

Field of the Invention

This invention relates to composition brake blocks for railroad service. More particularly it relates to molded composition brake blocks which are highly resistant to wear and which have long service life under exaggerated conditions imposed by prolonged exposure to high temperatures and abrasion.

Description of the Prior Art

Composition brake blocks for railroad service have previously been described in U.S. Pat. Nos. 2,686,140 and 2,861,964. Such compositions provide excellent uniform friction levels for good stopping distances throughout all speeds up to and including high speed stops from 100 m.p.h., uniform wet-to-dry friction and stopping distance ratios, and decidedly improved shoe or wear life over the previous conventional all cast iron railroad brake blocks. However, the composition brake blocks of those patents are taxed when subjected to the very severe and exaggerated conditions imposed by the high temperatures and abrasion of continuously braking very heavy wheel loads on extended grades. In an attempt to overcome this deficiency, brake blocks of the compositions described in U.S. Pat. No. 3,152,099 were developed. These compositions comprise cast iron chips, asbestos fiber, SBR or nitrile rubber, litharge, thermosetting resins and large quantities of zinc oxide. Such composition brake shoes have been found to provide superior braking service, in that they will hold high wheel loads of at least about 33,000 pounds at constant speeds of approximately 20 m.p.h. while descending continuous grades of over 2½% for periods of one hour or more.

Other improved brake blocks are described in U.S. Pat. 3,390,113.

In spite of the superior braking characteristics, however, the brake blocks of U.S. Pat. No. 3,152,099 have been found to exhibit relatively high and variable degrees of wear. This necessitates relatively frequent brake shoe changes, which in turn requires that the railroad cars equipped with such composition brake blocks must be taken out of revenue service for brake shoe changes more frequently, thus reducing the earning potential of each particular car.

It is therefore an object of this invention to provide a composition brake block which will have the superior braking properties of the brake blocks of U.S. Pat. No. 3,152,099, while also having a substantially reduced and constant wear rate.

BRIEF SUMMARY OF THE INVENTION

It has now been discovered that a composition brake block for railroad service having good braking property and superior wear resistance can be formed from the following composition, with all components expressed as weight percent:

|  | Percent |
|---|---|
| Rubber (SBR or nitrile) | 6–15 |
| Thermosetting resin | 1–6 |
| Cast iron chips | 25–40 |
| Lead component | 5–25 |
| Asbestos fiber | 5–15 |
| Sulfur | 1–6 |
| Zinc oxide | 0.1–2 |
| Rubber additives | 0.1–5 |
| Graphite | 0–7 |
| Carbon black | 0–10 |
| Fillers | Balance |

The critical feature of the present invention is the use of the SBR or nitrile rubber in combination with a low percentage of zinc oxide. It has been surprisingly found that the low zinc oxide concentration produces a brake block having a low constant wear rate rather than the high variable wear rate found in the high zinc oxide content compositions, such as the brake shoes of U.S. Pat. No. 3,152,099.

DETAILED DESCRIPTION AND PREFERRED EMBODIMENTS

The compositions of this invention are useful as brake blocks in railroad service. They provide superior braking properties during severe use, such as that experienced when a heavy freight train descends a steep grade with the brakes applied to maintain a constant slow speed. The compositions of this invention provide brake shoes which are extremely wear resistant, thus significally extending the service life of the brake and reducing the amount of time a particular railroad car must be out of service for brake replacement.

In their broader and more preferred embodiments the compositions of this invention consist essentially, in percentages by weight, of:

| Component | Broad range, percent | Preferred range, percent |
|---|---|---|
| Rubber (SBR or nitrile) | 6–15 | 9–13 |
| Thermosetting resin | 1–6 | 2–4 |
| Cast iron chips | 25–40 | 28–35 |
| Lead component | 5–25 | 10–17 |
| Asbestos fibers | 5–15 | 7–12 |
| Sulfur | 1–6 | 2–4 |
| Zinc oxide | 0.1–2 | 0.3–1 |
| Rubber additives | 0.1–5 | 1–3 |
| Graphite | 0–7 | 1–5 |
| Carbon black | 0–10 | 1–5 |
| Fillers | Balance | Balance |

The heat resistant rubber component comprises one or a combination of the more heat resistant vulcanizable synthetic rubber compositions selected from the group consisting of styrene-butadiene rubbers (SBR), butadiene-acrylonitrile (nitrile) rubbers and mixtures thereof. The cast iron chips preferably consist of particles comparable in size and composition to those disclosed in U.S. Pat. No. 2,686,140. The thermosetting resin will be a temperature resistant resin or combination of resins, preferably selected from those resins formed by reaction of phenolic material and an aldehyde. Other suitable resins may be polymethylol phenol resins or halogenated butyl compatible resins, as described in U.S. Pat. No. 3,390,113. The lead component will comprise lead powder, litharge, other conventional lead containing friction material components, or mixtures thereof. The asbestos fibers will generally be chrysotile of one of the shorter varieties, such as grade 7 as determined by the Quebec Standard Screen Test. The rubber additives, graphite, carbon black and possible fillers are all of a conventional nature, with a particulate size and form suitable for friction material application.

Of critical importance is the amount of zinc oxide present. When the zinc oxide is maintained between 0.1 to 2 weight percent, and preferably between 0.3 and 1 weight percent, the brake blocks of this composition have been found to exhibit a low constant average wear in the wear test to be described below. Those compositions of the prior art containing greater amounts of zinc oxide, and particularly those containing large amounts of zinc oxide in combination with SBR and/or nitrile rubber, such as described in U.S. Pat. No. 3,152,099, show wear rates substantially higher, in some cases having approximately double the wear obtained with the present composition.

As an alternative for the addition of each of the components separately, all or a portion of the total of individual components may be provided in the form of composite hard rubber friction particles having the composition and particle size described in U.S. Pat. No. 2,686,140. When such particles are used they will generally be present as from 25–40 weight percent, preferably 30–38 weight percent of the overall composition. The individual percentages of each of the materials present as part of the hard rubber particles will then be reduced accordingly. Thus, for example, if the hard rubber particles are present as 33% of the composition and the particle contains 3% of phenolic resin (i.e., 1% based on the overall brake block composition) the amount of phenolic resin required to be added individually may be reduced by a comparable 1%.

A satisfactory and preferred means for producing the wear and temperature resistant brake blocks of this invention comprises simply soaking the rubber component in sufficient gasoline and/or petroleum derived aromatic solvents to gelatinize the rubber, adding the dry powdered ingredients, and mixing until dispersed throughout the gelatinized rubbery mass, followed by addition of the asbestos fiber and further mixing until all components are uniformly blended into a coherent moist mass. The resulting mixture of ingredients is extruded as pellets or otherwise shaped into discrete particles for drying and subsequent molding. Once dried, these pellets or particles are molded or consolidated into a suitable configuration such as a conventional composition railroad brake block by the application of pressure and heat to form a dense block and vulcanize the binder component and initiate the cure of the thermosetting resin. Typical reaction conditions are 3,000 p.s.i. pressure and 90 pounds of steam for a period of 40 minutes. After forming and consolidation the brake blocks are preferably baked for about 12 hours at a temperature of approximately 300° F. to complete the cure of the resin reinforcement.

The following examples will illustrate the superior wear resistance of the compositions of this invention, as compared to those of the prior art, and in particular to the high zinc oxide content materials of the type described in U.S. Pat. No. 3,152,099. In the composition table below, where two percentage figures are shown, the first figure represents the total amount of that component in the composition, while the second figure (in parenthesis) indicates the amount of that component which was provided as part of a hard rubber particle component, which constituted 35% of the composition. Thus, for instance, the phenolic resin component is present as 3% total, based on the composition; of this 2% is provided as an individual component and 1% is present in the hard rubber particle component.

| Component: | Approximate percent by weight |
|---|---|
| Styrene-butadiene rubber | 11. |
| Phenolic resin | 3 (1). |
| Sulfur | 2.6 (2.4). |
| Zinc oxide | As noted. |
| Cast iron chips | 31. |
| Asbestos fiber (Grade 7D) | 10. |
| Carbon black | 3. |
| Lead component | 14 (14). |
| Fillers | Balance to 100%. |
| Graphite | 2 (2). |
| Rubber additives | 1. |

Compositions of this invention were tested in a wear test against compositions representative of the high zinc oxide compositions of the prior art. In each case the zinc oxide content was fixed and the percentages of the other components adjusted proportionately to total 100%. Since the percentage change of any individual component was therefore small compared to the variation of zinc oxide, the effect on wear rate of the former was not significant.

In the wear test a driven head containing a friction material sample of 1⅝" diameter by ½" thickness is forced against a stationary plate of railroad car wheel steel under a load of 100 p.s.i. The driven head is rotated at predetermined velocities of from 0 to 6000 ft./min. After an initial run-in period, the actual test is conducted in the following manner: The sample is first precisely weighed and measured. It is then put through four "phases" of engagement with the steel plate. In each phase the sample makes 30 engagements with the plate; each engagement lasts 15 seconds and is followed by a 45-second cooling and disengagement interval. At the end of each phase the sample is precisely weighed and measured. Velocity of the driven head is as follows:

| Phase: | Velocity, ft./min. |
|---|---|
| A | 1500 |
| B | 3000 |
| C | 4500 |
| D | 6000 |

Following the four phases, a final "drag" phase is conducted. In this phase the sample and steel plate are held in continuous engagement for 30 minutes while the driven head is run at 1760 ft./min. Thereafter the friction is obtained from torque charts and the wear is calculated as in.$^3$/HP-hr. Results of these tests are shown in the table below:

| Zinc oxide content, percent: | Wear, in.$^3$/HP-hr. |
|---|---|
| 0.6 | [1] 0.026 |
| 2.1 | 0.026 |
| 3.6 | 0.034 |
| 6.0 | 0.047 |

[1] Average.

It will be seen from these data that at a zinc oxide content of 2% or less the wear rate remains at a constant value, while above the 2% limit the wear rapidly increases from the low constant value of the compositions of this invention as zinc oxide content increases.

A particularly preferred composition has been found to have the following composition:

| Component: | Approximate percent by weight |
|---|---|
| Styrene butadiene rubber | 11.1 |
| Phenol-aldehyde resin | 3.0 |
| Cast iron chips | 31.4 |
| Lead component | 14.1 |
| Asbestos fibers (Grade 7D) | 10.2 |
| Sulfur | 2.6 |
| Zinc oxide | 0.5 |
| Graphite | 1.8 |
| Carbon black | 3.1 |
| Rubber additives | 0.8 |
| Fillers (organic and inorganic) | Balance¹ |

¹ Approximately 21.6%.

What is claimed is:

1. A composition useful in brake blocks for railroad car wheels, said brake blocks having low constant average wear rates, which consists essentially, in percentage by weight, of:

| | Percent |
|---|---|
| Rubber component | 6–15 |
| Thermosetting resin | 1–6 |
| Cast iron chips | 25–40 |
| Lead component | 5–25 |
| Asbestos fiber | 5–15 |
| Sulfur | 1–6 |
| Zinc oxide | 0.1–2 |
| Rubber additives | 0.1–5 |
| Graphite | 0–7 |
| Carbon black | 0–10 |
| Fillers | Balance |

2. The composition of Claim 1 wherein said rubber component is a styrene-butadiene rubber.

3. The composition of Claim 1 wherein said rubber component is a butadiene-acrylonitrile rubber.

4. The composition of Claim 1 wherein a portion of the components are present as composite hard rubber particles incorporated into the composition.

5. The composition of Claim 4 wherein said composite hard rubber particles are present as 25–40 weight percent of the composition.

6. The composition of Claim 1, consisting essentially, in percentage by weight, of:

| | Percent |
|---|---|
| Rubber component | 9–13 |
| Thermosetting resin | 2–4 |
| Cast iron chips | 28–35 |
| Lead component | 10–17 |
| Asbestos fibers | 7–12 |
| Sulfur | 2–4 |
| Zinc oxide | 0.3–1 |
| Rubber additives | 1–3 |
| Graphite | 1–5 |
| Carbon black | 1–5 |
| Fillers | Balance |

7. The composition of Claim 6 wherein said rubber component is a styrene-butadiene rubber.

8. The composition of Claim 6 wherein said rubber component is a butadiene-acrylonitrile rubber.

9. The composition of Claim 6 wherein a portion of the components are present in composite hard rubber particles incorporated into the composition.

10. The composition of Claim 9 wherein said composite hard rubber particles are present as 30 to 38 weight percent of the composition.

11. The composition of Claim 1, consisting essentially, in percentage by weight, of:

| | Percent |
|---|---|
| Styrene-butadiene rubber | 11.1 |
| Phenol-aldehyde resin | 3.0 |
| Cast iron chips | 31.4 |
| Lead component | 14.1 |
| Asbestos fibers | 10.2 |
| Sulfur | 2.6 |
| Zinc oxide | 0.5 |
| Graphite | 1.8 |
| Carbon black | 3.1 |
| Rubber additives | 0.8 |
| Fillers | Balance |

12. A railroad car brake shoe comprising the composition of Claim 1.

13. A railroad car brake shoe comprising the composition of Claim 6.

14. A railroad car brake shoe comprising the composition of Claim 11.

References Cited

UNITED STATES PATENTS

| 3,344,094 | 9/1967 | De Gaugue | 260—DIG. 39 |
| 3,152,099 | 10/1964 | De Gaugue | 260—DIG. 39 |
| 2,686,140 | 8/1954 | De Gaugue | 260—DIG. 39 |
| 3,007,890 | 11/1961 | Twiss et al. | 260—DIG. 39 |

ALLAN LIEBERMAN, Primary Examiner

S. M. PERSON, Assistant Examiner

U.S. Cl. X.R.

106—36; 260—41.5 R, DIG. 40